(12) United States Patent
Chang

(10) Patent No.: US 7,396,195 B2
(45) Date of Patent: Jul. 8, 2008

(54) SAFETY PROTECTIVE DEVICE FOR WORKING MACHINE

(76) Inventor: Pin-Feng Chang, 16-1, Lane 884, San Feng Rd., Feng Yuan, Taichung Hsien (TW)

( * ) Notice: Subject to any disclaimer, the term of this patent is extended or adjusted under 35 U.S.C. 154(b) by 530 days.

(21) Appl. No.: 11/119,545

(22) Filed: May 2, 2005

(65) Prior Publication Data

US 2006/0243109 A1 Nov. 2, 2006

(51) Int. Cl.
B23B 47/00 (2006.01)
B26D 5/00 (2006.01)

(52) U.S. Cl. .......... 408/234; 408/241 G; 408/710; 409/134; 74/609; 144/251.1

(58) Field of Classification Search .......... 408/234, 408/710, 31, 42, 45, 87, 95, 114, 236, 241, 408/241 G; 409/134, 235; 74/609; 144/251.1
See application file for complete search history.

(56) References Cited

U.S. PATENT DOCUMENTS

| | | | | |
|---|---|---|---|---|
| 1,783,476 A | * | 12/1930 | Klugh et al. | 144/251.2 |
| 3,063,320 A | * | 11/1962 | Beagley | 83/397 |
| 3,824,890 A | * | 7/1974 | Zettler et al. | 409/134 |
| 4,126,081 A | * | 11/1978 | Zdeb | 409/134 |
| 4,137,795 A | * | 2/1979 | Lindquist | 74/613 |
| 4,484,845 A | * | 11/1984 | Pennella et al. | 409/134 |
| 4,553,950 A | * | 11/1985 | Teich | 464/176 |
| 4,842,031 A | * | 6/1989 | Peek | 144/251.2 |
| 4,966,505 A | * | 10/1990 | Winkler et al. | 409/134 |
| 5,107,910 A | * | 4/1992 | Sasaki | 144/48.1 |
| 5,617,987 A | * | 4/1997 | Howard et al. | 226/189 |
| 5,971,679 A | * | 10/1999 | Kim | 409/134 |
| 6,327,761 B1 | * | 12/2001 | Magnuson | 29/33 Q |
| 6,547,498 B1 | * | 4/2003 | Sugata et al. | 409/134 |

* cited by examiner

Primary Examiner—Monica S. Carter
Assistant Examiner—Michael W Talbot
(74) Attorney, Agent, or Firm—Alan Kamrath; Kamrath & Associates PA

(57) ABSTRACT

A working machine includes a blade seat movable relative to a sheet plate, and a safety protective device mounted on the blade seat to cover the blades of the blade seat and including at least one swing member pivotally mounted on the blade seat, and a protective board pivotally connected to the at least one swing member. Thus, when any portion of the protective board is pushed by the sheet plate, the whole protective board is driven to pivot relative to the blade seat so that the protective board is moved upward and downward in a whole manner without deflection.

17 Claims, 10 Drawing Sheets

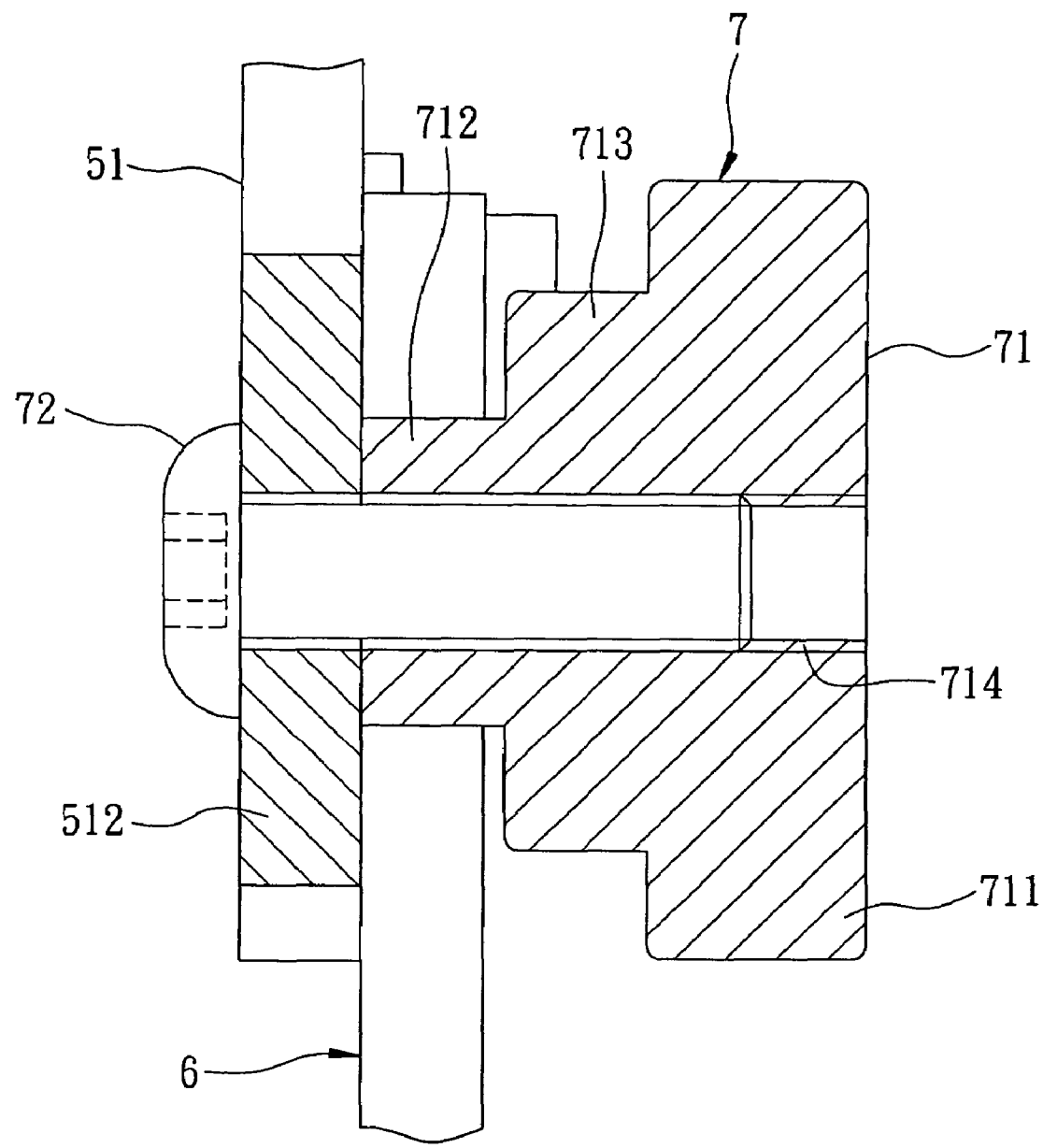
F I G. 5

SAFETY PROTECTIVE DEVICE FOR WORKING MACHINE

BACKGROUND OF THE INVENTION

1. Field of the Invention

The present invention relates to a safety protective device, and more particularly to a safety protective device for a working machine, such as a drilling machine or the like.

2. Description of the Related Art

A conventional working machine, such as a drilling machine 1, in accordance with the prior art shown in FIGS. 9 and 10 comprises a blade seat 11 movable relative to a sheet plate 2 and having a bottom face provided with a plurality of blades 12 to move therewith, and a protective cover 13 mounted on the blade seat 11 to cover the blades 12 of the blade seat 11. The protective cover 13 is formed with two elongated slots 131, and the blade seat 11 is provided with two limit posts 111 each slidably mounted in a respective one of the two elongated slots 131, so that the protective cover 13 is movable relative to the blade seat 11.

However, when the bottom edge 132 of the protective cover 13 is rested on the sheet plate 2, one side of the bottom edge 132 of the protective cover 13 is pushed upward by the sheet plate 2 and the other side of the bottom edge 132 of the protective cover 13 is not stopped by the sheet plate 2 and is moved downward by movement of the protective cover 13, so that the protective cover 13 is deflected and the elongated slots 131 of the protective cover 13 are interlocked with the limit posts 111 of the blade seat 11, thereby affecting movement of the blade seat 11 due to deflection of the protective cover 13.

SUMMARY OF THE INVENTION

In accordance with the present invention, there is provided a working machine, comprising a blade seat movable relative to a sheet plate and having a bottom face provided with a plurality of blades to move therewith, and a safety protective device mounted on the blade seat to cover the blades of the blade seat and including at least one swing member pivotally mounted on the blade seat, a protective board pivotally connected to the at least one swing member, and at least one pivot member mounted between the protective board and the respective swing member to attach the protective board to the respective swing member.

The primary objective of the present invention is to provide a working machine having a safety protective device that is operated in a whole manner without deflection.

Another objective of the present invention is to provide a working machine, wherein each of the swing members is pivotally mounted between the blade seat and the protective board, so that the protective board is pivotable relative to the blade seat.

A further objective of the present invention is to provide a working machine, wherein when any portion of the protective board is pushed or pressed by the sheet plate, the whole protective board is driven to pivot relative to the blade seat so that the protective board is moved upward and downward in a whole manner without deflection.

A further objective of the present invention is to provide a working machine, wherein the protective board is moved upward and downward without deflection, so that the protective board is moved smoothly during movement of the blade seat, thereby facilitating the operator operating the blade seat.

Further benefits and advantages of the present invention will become apparent after a careful reading of the detailed description with appropriate reference to the accompanying drawings.

BRIEF DESCRIPTION OF THE DRAWINGS

FIG. 5 is a partially plan cross-sectional view of the working machine as shown in FIG. 3;

DETAILED DESCRIPTION OF THE INVENTION

Figure 1:
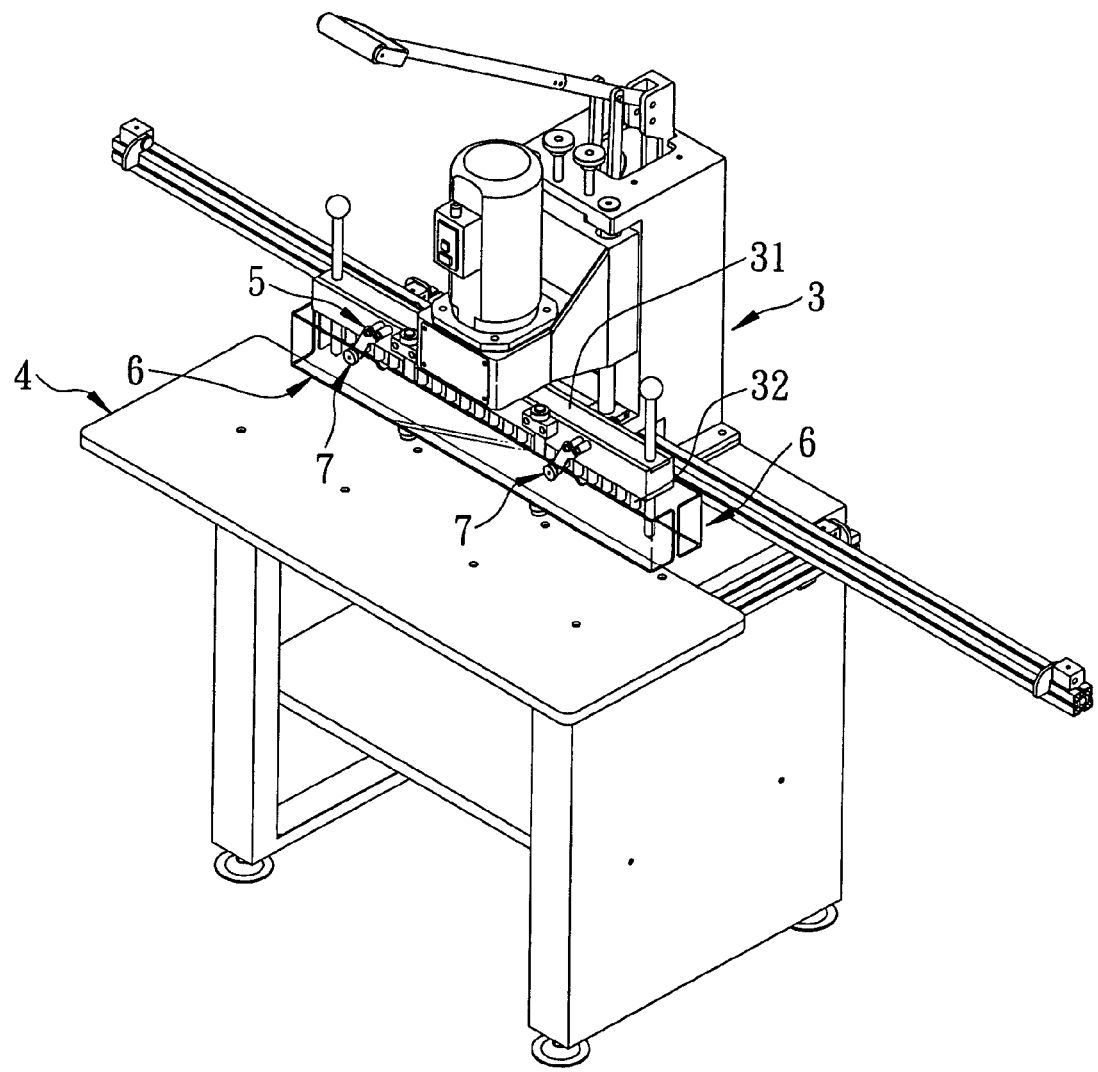
FIG. 1 is a perspective view of a working machine in accordance with the preferred embodiment of the present invention.
Figure 2:
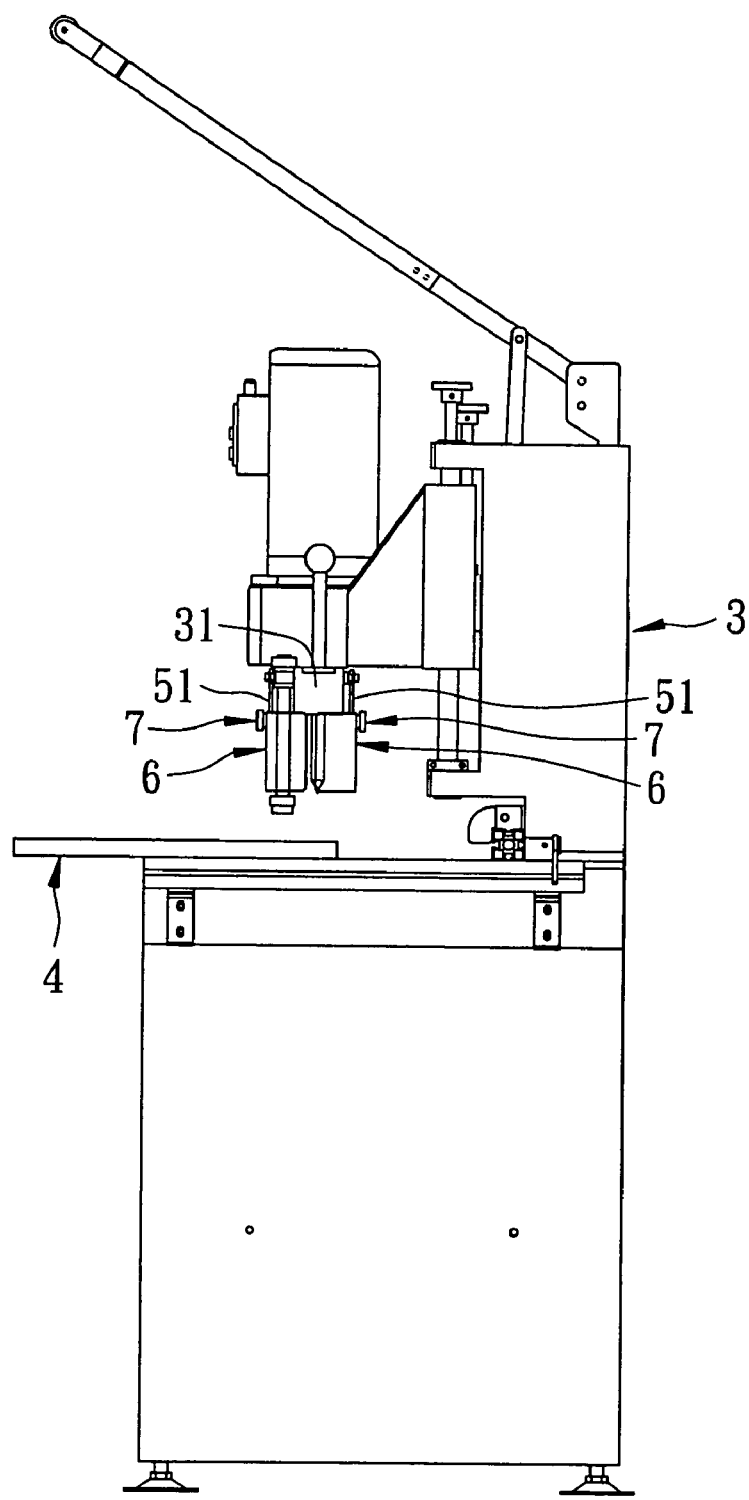
FIG. 2 is a side plan view of the working machine as shown in FIG. 1.
Figure 3:
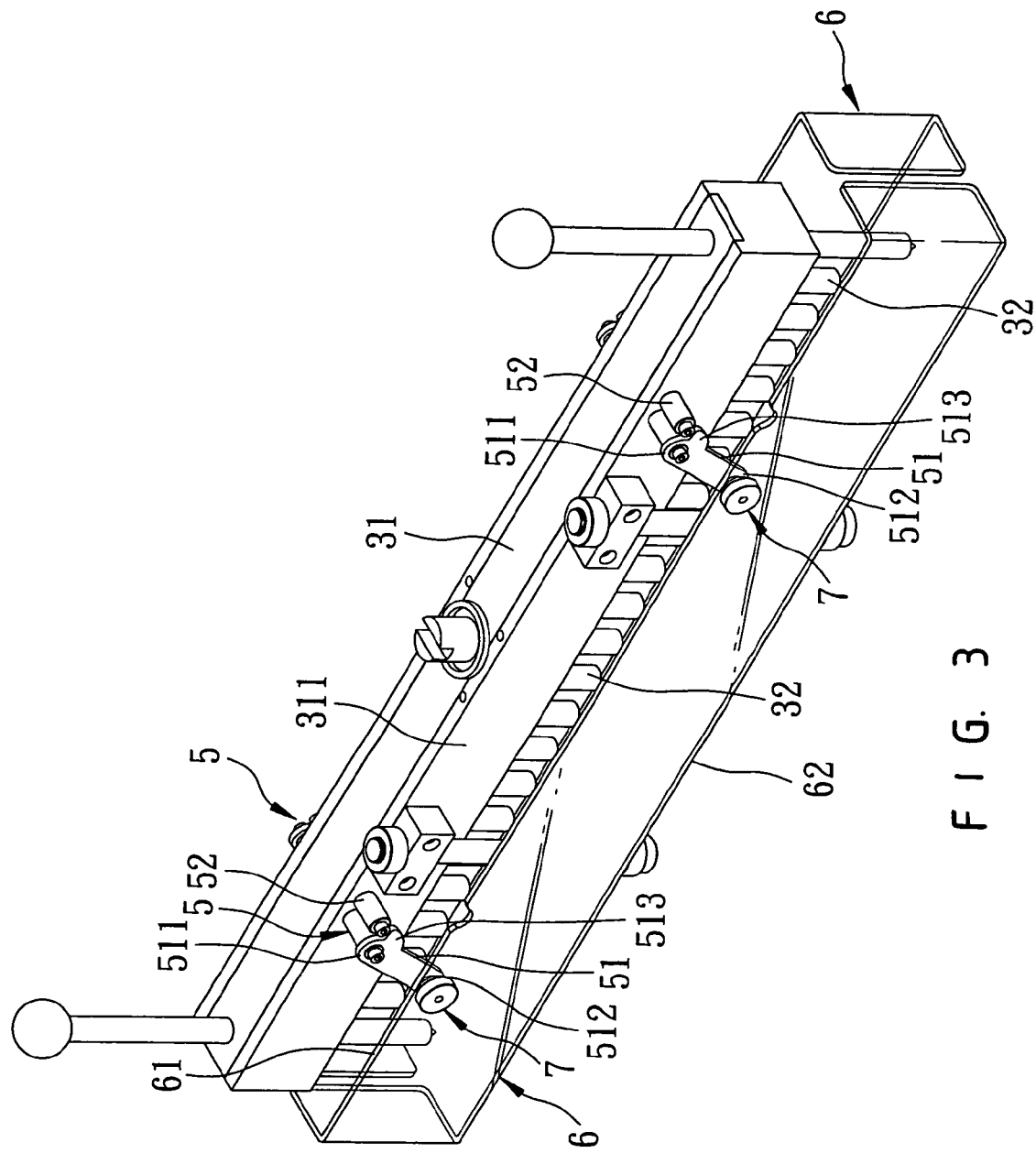
FIG. 3 is a locally perspective enlarged view of the working machine as shown in FIG. 1.
Figure 4:
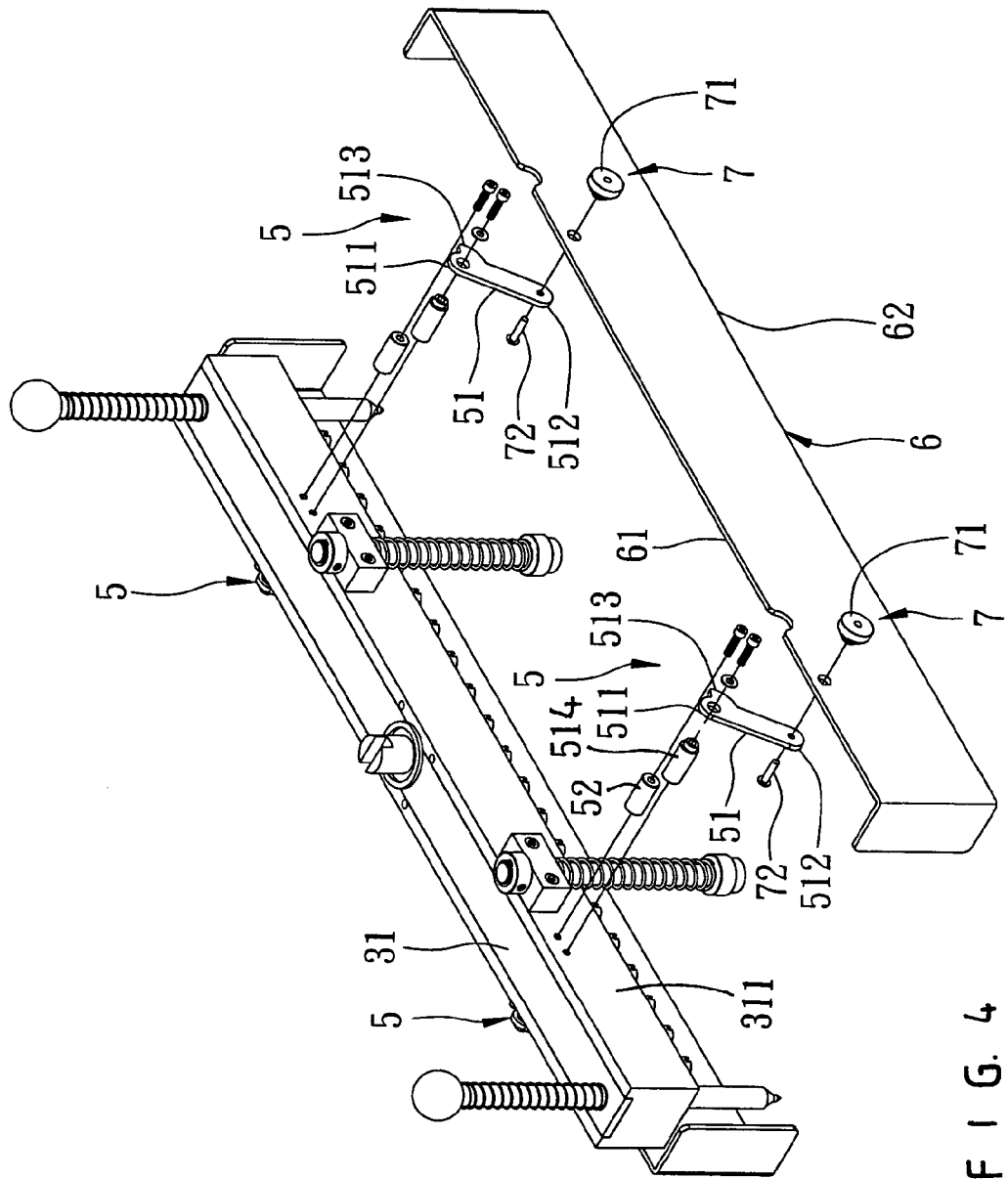
FIG. 4 is an exploded perspective view of the working machine as shown in FIG. 3.
Figure 6:
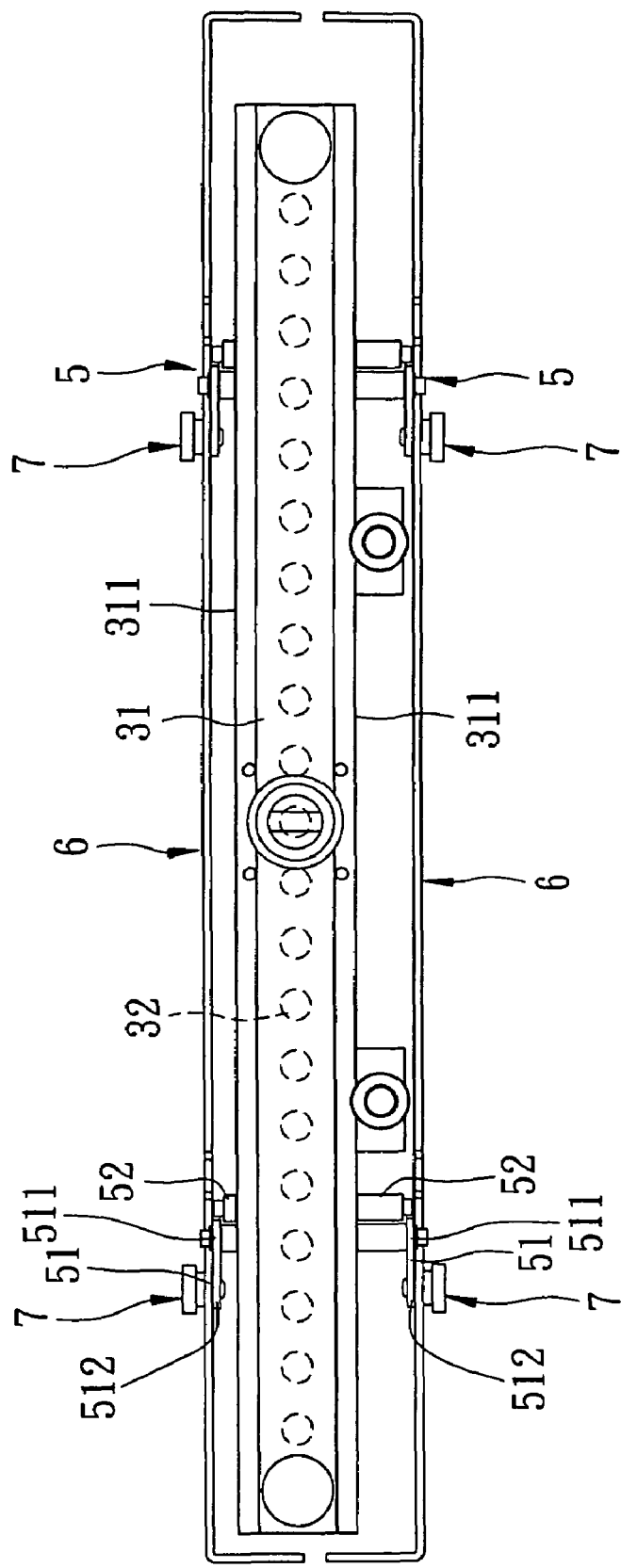
FIG. 6 is a top plan view of the working machine as shown in FIG. 3.

Referring to the drawings and initially to FIGS. 1-7, a working machine, such as a drilling machine 3, in accordance with the preferred embodiment of the present invention comprises a blade seat 31 movable relative to a sheet plate 4 and having a bottom face provided with a plurality of blades 32 to move therewith, and a safety protective device mounted on the blade seat 31 to cover the blades 32 of the blade seat 31.

The blade seat 31 has two opposite sides 311, and the safety protective device is selectively mounted on either one of the two opposite sides 311 of the blade seat 31. Preferably, the safety protective device is mounted on each of the two opposite sides 311 of the blade-seat 31.

The safety protective device includes two swing members 5, a protective board 6, and two pivot members 7.

Each of the swing members 5 is pivotally mounted on each of the two opposite sides 311 of the blade seat 31 and includes a stop post 52 secured on the blade seat 31, and a swing arm 51 having a first end formed with a pivot portion 511 pivotally mounted on the blade seat 31 by a pivot shaft 514 and a second end formed with a swing portion 512 swingable about the pivot portion 511. The first end of the swing arm 51 is formed with an outward extending stop portion 513 located beside the pivot portion 511 and movable to rest on the stop post 52. The stop post 52 is located beside the pivot portion 511 of the swing arm 51.

The protective board 6 is substantially U-shaped. The protective board 6 is extended toward a width direction of the blade seat 31 and has a top edge 61 and a bottom edge 62. The bottom edge 62 of the protective board 6 is movable to rest on the sheet plate 4. The protective board 6 is pivotally connected to the swing members 5, wherein the swing portion 512 of the swing arm 51 of each of the swing members 5 is pivotally mounted on the protective board 6. Thus, each of the swing members 5 is pivotally mounted between the blade seat 31 and the protective board 6, so that the protective board 6 is pivotable relative to the blade seat 31.

Each of the pivot members 7 is mounted between the protective board 6 and the respective swing member 5 to attach the protective board 6 to the respective swing member 5. Each of the pivot members 7 includes a bolt head 71 rotatably mounted on the protective board 6, and a bolt 72 extended through the respective swing member 5 and screwed into the bolt head 71 to attach the protective board 6 to the respective swing member 5. The bolt head 71 includes a rotation portion 711 rotatably mounted on the protective board 6, a step portion 713 mounted on a side of the rotation portion 711 and rested on the protective board 6, and an axle 712 extended through the protective board 6 and rested on the swing portion 512 of the swing arm 51 of the respective swing member 5. The axle 712 of the bolt head 71 is located adjacent to the top edge 61 of the protective board 6. The bolt head 71 has an inside formed with a screw bore 714, and the bolt 72 is extended through the swing portion 512 of the swing arm 51 of the respective swing member 5 and screwed into the screw bore 714 of the bolt head 71 so that the protective board 6 is pivotally mounted on the swing members 5. The screw bore 714 of the bolt head 71 is extended through the rotation portion 711, the step portion 713 and the axle 712.

Thus, the protective board 6 drives the swing portion 512 of the swing arm 51 of each of the swing members 5 to move downward by the gravity of the protective board 6 so that the pivot portion 511 of the swing arm 51 of each of the swing members 5 is pivoted on the blade seat 31 until the stop portion 513 of the swing arm 51 of each of the swing members 5 is rested on and stopped by the stop post 52. In addition, the bolt head 71 is rotated to screw or unscrew the bolt 72 so as to mount the protective board 6 on the swing members 5 or detach the protective board 6 from the swing members 5 so that the protective board 6 is mounted on or detached from the swing members 5 by rotation of the bolt head 71, thereby facilitating a user mounting or detaching the protective board 6 without needing aid of any tool. Further, the bolt head 71 reduces loss of the protective board 6 during the swinging process.

Figure 7:
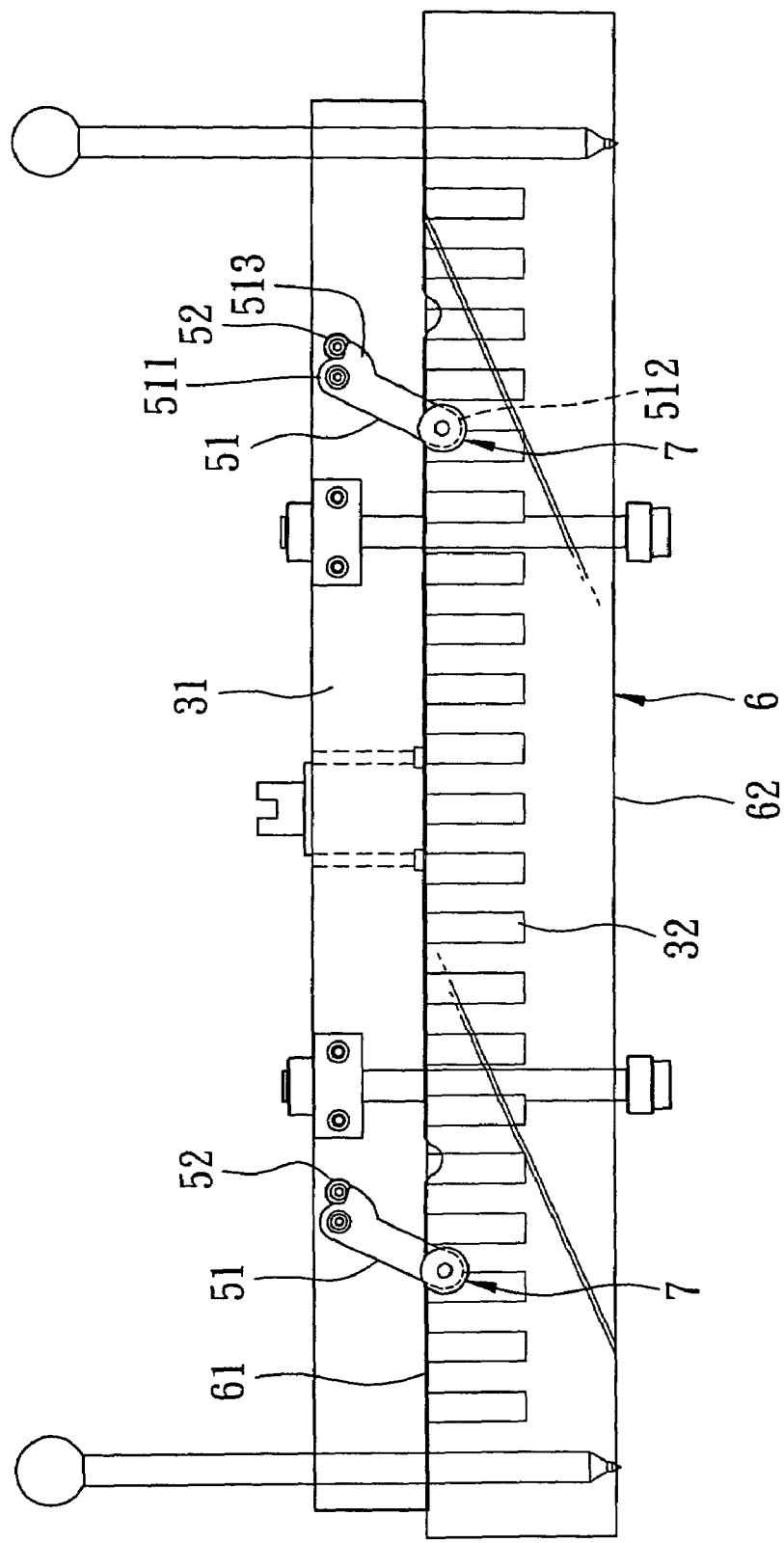
FIG. 7 is a front plan view of the working machine as shown in FIG. 3.
Figure 8:
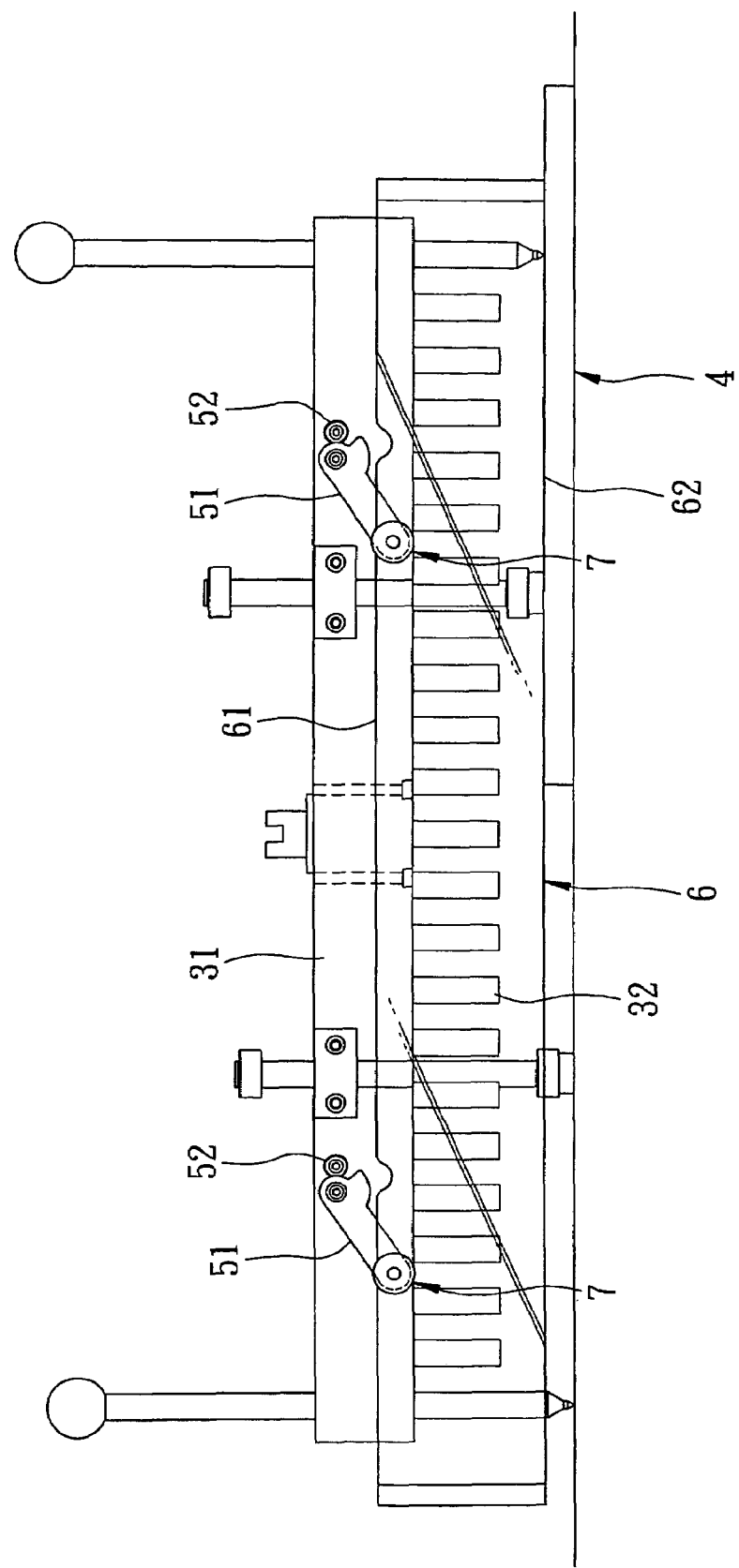
FIG. 8 is a schematic operational view of the working machine as shown in FIG. 7.
Figure 9:
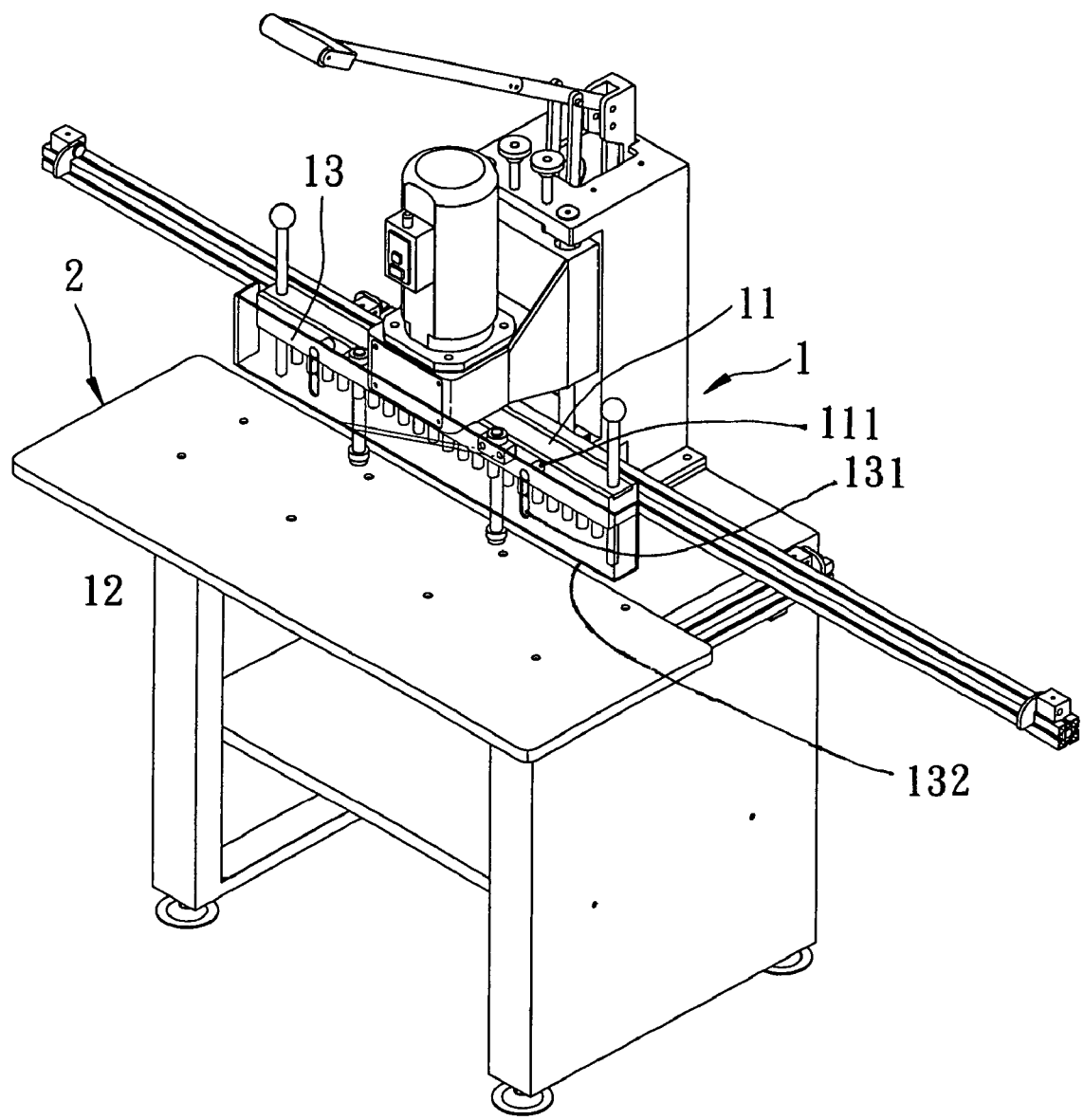
FIG. 9 is a perspective view of a conventional working machine in accordance with the prior art.
Figure 10:
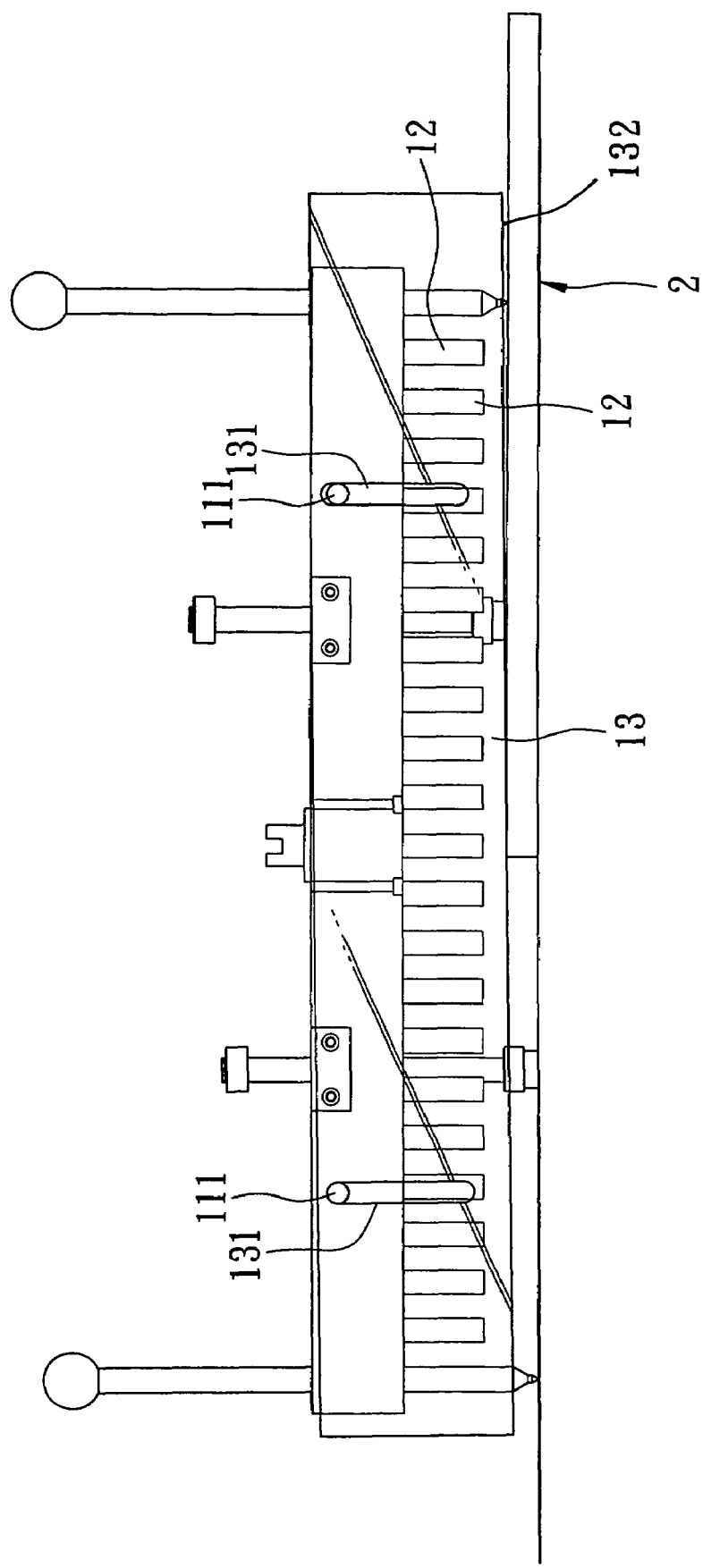
FIG. 10 is a front plan view of the conventional working machine as shown in FIG. 9.

In operation, referring to FIGS. 7 and 8 with reference to FIGS. 1-6, when the blade seat 31 is moved downward toward the sheet plate 4, the protective board 6 is moved with the blade seat 31 until the bottom edge 62 of the protective board 6 is rested on the sheet plate 4. At this time, the protective board 6 is pushed by the sheet plate 4 to move upward slightly to drive each of the swing members 5 to pivot in the opposite direction. In such a manner, the protective board 6 is closely adjacent to the sheet plate 4 to isolate the blades 32, thereby preventing the user's hands from touching the blades 32 so as to protect the user's safety during operation of the working machine.

Accordingly, each of the swing members 5 is pivotally mounted between the blade seat 31 and the protective board 6, so that the protective board 6 is pivotable relative to the blade seat 31. In addition, when any portion of the protective board 6 is pushed or pressed by the sheet plate 4, the whole protective board 6 is driven to pivot relative to the blade seat 31 so that the protective board 6 is moved upward and downward in a whole manner without deflection. Further, the protective board 6 is moved upward and downward without deflection, so that the protective board 6 is moved smoothly during movement of the blade seat 31, thereby facilitating the operator operating the blade seat 31.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A working machine, comprising:
   a blade seat movable relative to a sheet plate and having a bottom face provided with a plurality of blades to move therewith;
   a safety protective device mounted on the blade seat to cover the blades of the blade seat and including at least one swing member pivotally mounted on the blade seat, and a protective board pivotally connected to the at least one swing member;
   wherein the swing member includes a swing arm having a first end formed with a pivot portion pivotally mounted on the blade seat and a second end formed with a swing portion pivotally mounted on the protective board;
   the swing member further includes a stop post secured on the blade seat, and the first end of the swing arm is formed with an outward extending stop portion located beside the pivot portion and movable to rest on the stop post.

2. The working machine in accordance with claim 1, wherein the pivot portion of the swing arm is pivotally mounted on the blade seat by a pivot shaft.

3. The working machine in accordance with claim 1, wherein the swing portion of the swing arm is swingable about the pivot portion.

4. The working machine in accordance with claim 1, wherein the stop post is located beside the pivot portion of the swing arm.

5. The working machine in accordance with claim 1, wherein the protective board is substantially U-shaped.

6. The working machine in accordance with claim 1, wherein the protective board is extended toward a width direction of the blade seat.

7. The working machine in accordance with claim 1, wherein the protective board has a top edge and a bottom edge, and the bottom edge of the protective board is movable to rest on the sheet plate.

8. The working machine in accordance with claim 7, wherein when the bottom edge of the protective board is rested on the sheet plate, the protective board is pushed by the sheet plate to move upward to drive the swing member to pivot.

9. The working machine in accordance with claim 1, wherein the swing member is pivotally mounted between the blade seat and the protective board, so that the protective board is pivotable relative to the blade seat.

10. The working machine in accordance with claim 1, wherein the blade seat has two opposite sides, and the safety protective device is selectively mounted on either one of the two opposite sides of the blade seat.

11. The working machine in accordance with claim 1, wherein the blade seat has two opposite sides, and the safety protective device is mounted on each of the two opposite sides of the blade seat.

12. The working machine in accordance with claim 11, wherein the swing member is pivotally mounted on each of the two opposite sides of the blade seat.

13. A working machine, comprising:
   a blade seat movable relative to a sheet plate and having a bottom face provided with a plurality of blades to move therewith;
   a safety protective device mounted on the blade seat to cover the blades of the blade seat and including at least one swing member pivotally mounted on the blade seat, and a protective board pivotally connected to the at least one swing member;

wherein the swing member includes a swing arm having a first end formed with a pivot portion pivotally mounted on the blade seat and a second end formed with a swing portion pivotally mounted on the protective board;

the safety protective device further includes at least one pivot member mounted between the protective board and the respective swing member to attach the protective board to the respective swing member;

the pivot member includes a bolt head rotatably mounted on the protective board, and a bolt extended through the respective swing member and screwed into the bolt head to attach the protective board to the respective swing member.

14. The working machine in accordance with claim 13, wherein the bolt head includes a rotation portion rotatably mounted on the protective board, a step portion mounted on a side of the rotation portion and rested on the protective board, and an axle extended through the protective board and rested on the swing portion of the swing arm of the respective swing member.

15. The working machine in accordance with claim 14, wherein the axle of the bolt head is located adjacent to a top edge of the protective board.

16. The working machine in accordance with claim 14, wherein the bolt head has an inside formed with a screw bore, and the bolt is extended through the swing portion of the swing arm of the respective swing member and screwed into the screw bore of the bolt head so that the protective board is pivotally mounted on the swing members.

17. The working machine in accordance with claim 16, wherein the screw bore of the bolt head is extended through the rotation portion, the step portion and the axle.

* * * * *